(12) United States Patent
Ichikawa

(10) Patent No.: US 9,381,878 B2
(45) Date of Patent: Jul. 5, 2016

(54) VEHICLE AND POWER TRANSMISSION/RECEPTION SYSTEM

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 92 days.

(21) Appl. No.: 14/118,978

(22) PCT Filed: Jun. 3, 2011

(86) PCT No.: PCT/JP2011/062816
§ 371 (c)(1),
(2), (4) Date: Nov. 20, 2013

(87) PCT Pub. No.: WO2012/164742
PCT Pub. Date: Dec. 6, 2012

(65) Prior Publication Data
US 2014/0077760 A1    Mar. 20, 2014

(51) Int. Cl.
*H02J 7/00*    (2006.01)
*B60R 16/03*    (2006.01)
(Continued)

(52) U.S. Cl.
CPC ........... *B60R 16/03* (2013.01); *B60L 1/006* (2013.01); *B60L 11/182* (2013.01);
(Continued)

(58) Field of Classification Search
CPC ......... H02J 5/005; H02J 7/025; H02J 7/0027; B60L 11/182
USPC .................................................. 320/104, 108
See application file for complete search history.

(56) References Cited

U.S. PATENT DOCUMENTS 7,741,734 B2    6/2010    Joannopoulos et al.
8,248,027 B2 *  8/2012    Sakoda et al. ................. 320/108
(Continued)

FOREIGN PATENT DOCUMENTS

AU    2006269374 B2    1/2007
AU    2006269374 C1    1/2007
(Continued)

OTHER PUBLICATIONS

Gluckman, David. "GM Partners with Powermat to Offer Wireless Charging in Chevy Volt, Other Cars". Car and Driver Blog, Jan. 8, 2011, https://web.archive.org/web/20110108131656/http://blog.caranddriver.com/gm-partners-with-powermat-to-offer-wireless-device-charging-in-chevy-volt-other-cars/.
(Continued)

*Primary Examiner* — Nghia Doan
(74) *Attorney, Agent, or Firm* — Oliff PLC

(57) ABSTRACT

A vehicle includes a power reception unit for receiving electric power in a non-contact manner by electromagnetic field resonance, and a device power feeding unit for transmitting electric power to be supplied to an in-vehicle electrical device in a non-contact manner by electromagnetic induction. A distance over which the electric power is transmitted from an external power transmission unit to the power reception unit in a non-contact manner is longer than a distance over which the electric power is transmitted from the device power feeding unit to the in-vehicle electrical device in a non-contact manner. The vehicle further includes a main battery for supplying electric power to a motor generator, and an auxiliary battery. The auxiliary battery has a voltage lower than a voltage of the main battery. The device power feeding unit receives electric power from the auxiliary battery and transmits the power to the in-vehicle electrical device.

8 Claims, 9 Drawing Sheets

(51) Int. Cl.
*B60L 1/00* (2006.01)
*B60L 11/18* (2006.01)
*H02J 7/02* (2016.01)

(52) U.S. Cl.
CPC ........ *B60L 11/1824* (2013.01); *B60L 11/1833* (2013.01); *H02J 7/025* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | |
|---|---|---|
| 2007/0222542 A1 | 9/2007 | Joannopoulos et al. |
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0225271 A1 | 9/2010 | Oyobe et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2011/0082612 A1 | 4/2011 | Ichikawa |
| 2011/0187321 A1* | 8/2011 | Hirayama .................... 320/108 |
| 2013/0033228 A1* | 2/2013 | Raedy .................. H02J 7/0027 320/108 |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101835653 A | 9/2010 |
| CN | 101860089 A | 10/2010 |
| EP | 1 902 505 A2 | 3/2008 |
| EP | 2 130 287 A1 | 12/2009 |
| EP | 2 716 488 A1 | 4/2014 |
| IN | 735/DELNP/2008 | 5/2008 |
| IN | 6195/DELNP/2009 | 7/2010 |
| JP | A-2005-110412 | 4/2005 |
| JP | A-2006-500894 | 1/2006 |
| JP | A-2007-104868 | 4/2007 |
| JP | A-2009-501510 | 1/2009 |
| JP | A-2009-296780 | 12/2009 |
| JP | A-2010-268660 | 11/2010 |
| KR | 2008-0031398 A | 4/2008 |
| KR | 2010-0015954 A | 2/2010 |
| WO | WO 2004/030176 A2 | 4/2004 |
| WO | WO 2007/008646 A2 | 1/2007 |
| WO | WO 2008/118178 A1 | 10/2008 |
| WO | WO 2010/052785 A1 | 5/2010 |
| WO | 2010/131349 A1 | 11/2010 |
| WO | 2011/024285 A1 | 3/2011 |

OTHER PUBLICATIONS

Wireless Power Consortium, "Leading Chinese Car Makers Display Qi Wireless Charging at Shanghai Auto Show", Sep. 26, 2011, http://www.wirelesspowerconsortium.com/data/downloadables/6/7/0/wpc_pr13_final_31may11_english.pdf.

Wireless Power Consortium, "System Description Wireless Power Transfer, vol. I: Low Power, Part 1: Interface Definition, Version 1.1.2", Jun. 30, 2013, http://www.wirelesspowerconsortium.com/downloads/wireless-power-specification-part-1.html.

* cited by examiner

VEHICLE AND POWER TRANSMISSION/RECEPTION SYSTEM

TECHNICAL FIELD

The present invention relates to a vehicle and a power transmission/reception system, and particularly to a vehicle and a power transmission/reception system transmitting/receiving power in a non-contact manner.

BACKGROUND ART

Vehicles configured such that a vehicle-mounted power storage device can be charged from outside, such as electric vehicles and plug-in hybrid vehicles, have been commercialized. Automatic charge, and techniques for guiding a vehicle to a parking position for automatic charge have also been studied. There is also a need to feed power in a vehicle to an in-vehicle electrical device, in order to charge a battery of a mobile phone and the like.

Japanese Patent Laying-Open No. 2007-104868 (Patent Document 1) discloses a charging apparatus for charging a battery of a mobile phone in a vehicle by electromagnetic induction.

CITATION LIST

Patent Document

PTD 1: Japanese Patent Laying-Open No. 2007-104868
PTD 2: Japanese Patent Laying-Open No. 2005-110412
PTD 3: WO 2010/052785

SUMMARY OF INVENTION

Technical Problem

There is a need to charge or feed power to a battery of a vehicle and an in-vehicle electrical device in a non-contact manner, since it is troublesome to establish connection using cables and wiring during charge and power feeding. Japanese Patent Laying-Open No. 2007-104868 mentioned above neither describes charging a battery of the vehicle from outside, nor specifically studies charging both the mobile phone and the battery of the vehicle in a non-contact manner.

In a method of transmitting power to an in-vehicle electrical device and a method of receiving power for charging a battery of a vehicle, efficient power transmission/reception may not be achieved unless their characteristics are considered. For example, in non-contact power transmission/reception by electromagnetic field resonance that has been studied in recent years, power feeding to or charging of both an in-vehicle electrical device and a battery of a vehicle by electromagnetic field resonance may affect the in-vehicle electrical device of low output, resulting in a failure of the device.

An object of the present invention is to provide a vehicle capable of receiving electric power for the running of the vehicle from outside in a non-contact manner, and a power transmission/reception system capable of transmitting electric power to be supplied to an in-vehicle electrical device in a non-contact manner.

Solution to Problem

In summary, in the present invention, a vehicle includes a power reception device for receiving electric power for running of the vehicle in a non-contact manner by electromagnetic field resonance, and a power transmission device for transmitting electric power to be supplied to an in-vehicle electrical device in a non-contact manner by electromagnetic induction.

Preferably, the electric power received by the power reception device from an external power transmission apparatus installed outside of the vehicle in a non-contact manner is larger than the electric power transmitted from the power transmission device to the in-vehicle electrical device in a non-contact manner.

Preferably, a distance over which the electric power is transmitted from the external power transmission apparatus installed outside of the vehicle to the power reception device in a non-contact manner is longer than a distance over which the electric power is transmitted from the power transmission device to the in-vehicle electrical device in a non-contact manner.

More preferably, the vehicle further includes a driving device for driving the vehicle, a main battery for supplying electric power to the driving device, and an auxiliary battery provided separately from the main battery. The auxiliary battery has a voltage lower than a voltage of the main battery. The power transmission device receives electric power from the auxiliary battery and transmits the power to the in-vehicle electrical device.

More preferably, the vehicle further includes a control unit for setting an operation state of the vehicle to a drivable state and a non-drivable state in accordance with operation by an occupant. In the drivable state, the control unit allows charging of the main battery with the electric power received by the power reception device, and allows power supply from the power transmission device to the in-vehicle electrical device. In the non-drivable state, the control unit allows charging of the main battery with the electric power received by the power reception device, and prohibits power supply from the power transmission device to the in-vehicle electrical device.

Preferably, position adjustment between the power reception device and the external power transmission apparatus installed outside of the vehicle is performed by movement of the vehicle. On the other hand, position adjustment between the in-vehicle electrical device and the power transmission device is performed by placement of the in-vehicle electrical device in a predetermined position of the power transmission device by an occupant.

More preferably, the power transmission device includes a device placement surface, which is not in electrical contact with the in-vehicle electrical device and on which the in-vehicle electrical device is placed.

In another aspect of the present invention, a power transmission/reception system includes a vehicle, a power transmission apparatus outside of the vehicle for transmitting electric power to the vehicle in a non-contact manner by electromagnetic field resonance, and an in-vehicle electrical device used in the vehicle. The vehicle includes a power reception device for receiving electric power for running of the vehicle from the power transmission apparatus outside of the vehicle in a non-contact manner by electromagnetic field resonance, and a power transmission device for transmitting electric power to be supplied to the in-vehicle electrical device in a non-contact manner by electromagnetic induction.

Advantageous Effects of Invention

According to the present invention, the non-contact reception of the electric power for the running of the vehicle from outside and the non-contact transmission of the electric power to be supplied to the in-vehicle electrical device can be performed without affecting each other.

DESCRIPTION OF EMBODIMENTS

Figure 1:
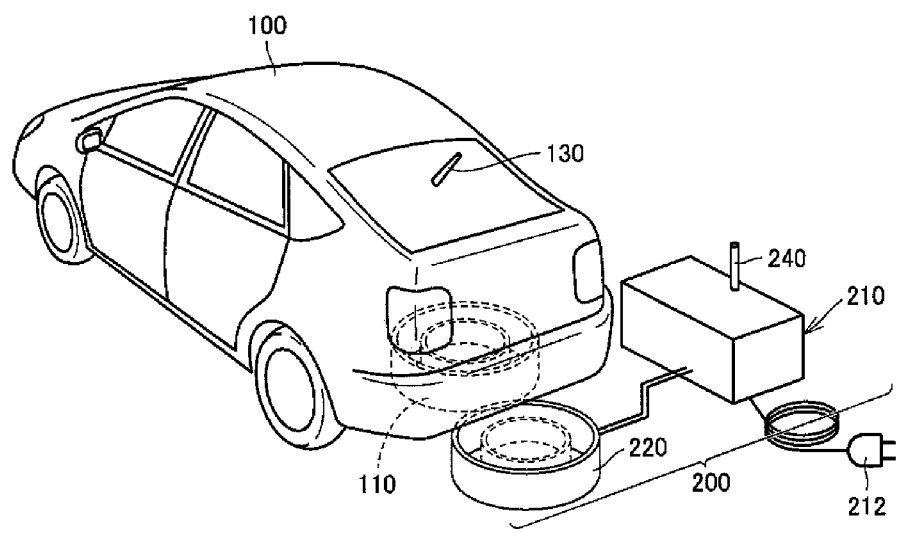
FIG. 1 is an overall configuration diagram of a vehicle power feeding system according to an embodiment of the present invention.

Embodiments of the present invention will be hereinafter described in detail with reference to the drawings, in which the same or corresponding parts are designated by the same reference characters, and description thereof will not be repeated.

FIG. 1 is an overall configuration diagram of a vehicle power feeding system according to an embodiment of the present invention.

Referring to FIG. 1, a power transmission/reception system 10 includes a vehicle 100 and a power feeding apparatus 200. Vehicle 100 includes a power reception unit 110 and a communication unit 130.

Power reception unit 110 is installed on the floor of a vehicle body, and configured to receive electric power from a power transmission unit 220 of power feeding apparatus 200 in a non-contact manner. Specifically, power reception unit 110 includes a self-resonant coil described later which resonates with a self-resonant coil provided in power transmission unit 220 through an electromagnetic field for receiving the electric power from power transmission unit 220 in a non-contact manner. Communication unit 130 serves as a communication interface for establishing communication between vehicle 100 and power feeding apparatus 200.

Power feeding apparatus 200 includes a high-frequency power supply device 210, power transmission unit 220, and a communication unit 240. High-frequency power supply device 210 converts commercial AC power supplied via a connector 212, for example, to high-frequency electric power, and outputs the power to power transmission unit 220. It is to be noted that the frequency of the high-frequency electric power generated by high-frequency power supply device 210 is, for example, 1 MHz to several tens of MHz.

Power transmission unit 220 is installed on the floor of parking space, for example, and configured to transmit the high-frequency electric power supplied from high-frequency power supply device 210 to power reception unit 110 of vehicle 100 in a non-contact manner. Specifically, power transmission unit 220 includes a self-resonant coil which resonates with the self-resonant coil provided in power reception unit 110 through the electromagnetic field for transmitting the electric power to power reception unit 110 in a non-contact manner. Communication unit 240 serves as a communication interface for establishing communication between power feeding apparatus 200 and vehicle 100.

When feeding power from power feeding apparatus 200 to vehicle 100, it is necessary to guide vehicle 100 to power feeding apparatus 200 and adjust the positions of power reception unit 110 of vehicle 100 and power transmission unit 220 of power feeding apparatus 200. That is, unlike an in-vehicle electrical device described later, it is not easy to adjust the position of vehicle 100. A user can readily lift the in-vehicle electrical device by hand and place it in an appropriate position of a power feeding unit such as a charger. The user, however, needs to operate and stop the vehicle in an appropriate position, and cannot lift the vehicle by hand and adjust the position of the vehicle.

Accordingly, when feeding power from power feeding apparatus 200 to vehicle 100, it is desirable to employ a method having high tolerance for position mismatch. It is said that an electromagnetic induction method transmits electric power over a short distance, and has low tolerance for position mismatch. If the electromagnetic induction method is employed to feed power to the vehicle, driving skills with high accuracy may be required of a driver, a vehicle guidance apparatus of high accuracy may be required to be mounted on the vehicle, or a movable unit for moving the position of the coil may be required so that a rough parking position can be handled.

It is said that a resonance method through an electromagnetic field can transmit relatively large electric power even over a transmission distance of several meters, and generally has higher tolerance for position mismatch than the electromagnetic induction method. As such, in power transmission/reception system 10 according to this embodiment, the resonance method is used to feed power from power feeding apparatus 200 to vehicle 100.

Figure 2:
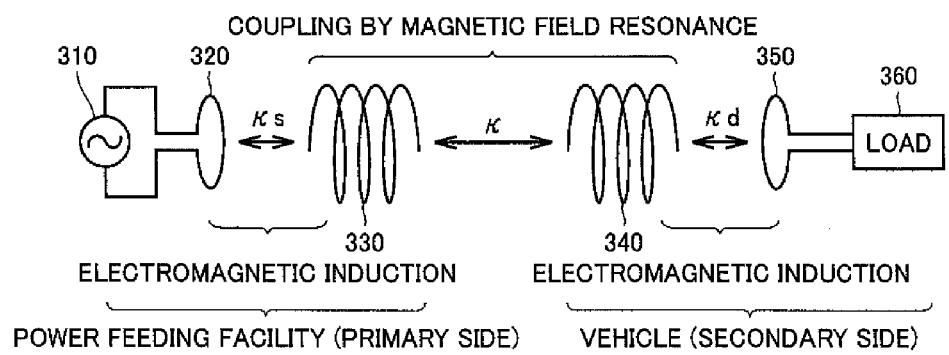
FIG. 2 is a diagram for illustrating the principle of power transmission by the resonance method.

FIG. 2 is a diagram for illustrating the principle of power transmission by the resonance method.

Referring to FIG. 2, according to this resonance method, as in the case where two tuning forks resonate with each other, two LC resonant coils having the same natural frequency resonate with each other in an electromagnetic field (near field), which causes electric power to be transmitted from one of the coils to the other coil through the electromagnetic field.

Specifically, a primary coil 320 is connected to a high-frequency power supply 310 to feed electric power having a high-frequency within a range from 1 M to several tens of MHz to a primary self-resonant coil 330 magnetically coupled to primary coil 320 by electromagnetic induction. Primary self-resonant coil 330 is an LC resonator consisting of an inductance of the coil itself and a stray capacitance, and resonates through an electromagnetic field (near field) with a secondary self-resonant coil 340 having the same resonance frequency as that of primary self-resonant coil 330. This causes the energy (electric power) to be transferred from primary self-resonant coil 330 through the electromagnetic field to secondary self-resonant coil 340. The energy (electric power) transferred to secondary self-resonant coil 340 is extracted by a secondary coil 350 magnetically coupled to secondary self-resonant coil 340 by electromagnetic induction, and supplied to a load 360. It is to be noted that the power transmission by the resonance method is implemented when a Q value showing the intensity of resonance between primary self-resonant coil 330 and secondary self-resonant coil 340 is greater than, for example, 100.

As compared to FIG. 1, secondary self-resonant coil 340 and secondary coil 350 correspond to power reception unit 110 in FIG. 1, and primary coil 320 and primary self-resonant coil 330 correspond to power transmission unit 220 in FIG. 1.

Figure 3:
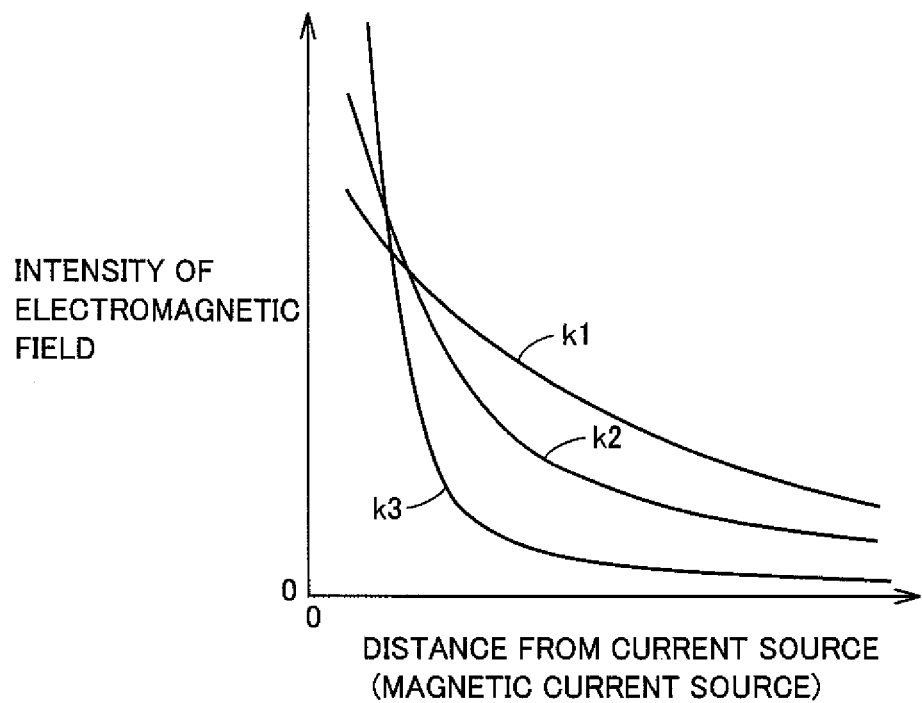
FIG. 3 is a diagram showing relation between the distance from a current source (magnetic current source) and the intensity of an electromagnetic field.

FIG. 3 is a diagram showing relation between the distance from a current source (magnetic current source) and the intensity of an electromagnetic field.

Referring to FIG. 3, the electromagnetic field includes three components. A curve k1 represents a component inversely proportional to the distance from the wave source and is referred to as a "radiation electromagnetic field." A curve k2 represents a component inversely proportional to the square of the distance from the wave source and is referred to as an "induction electromagnetic field." A curve k3 represents a component inversely proportional to the cube of the distance from the wave source and is referred to as an "electrostatic magnetic field."

Among others, there is a region where the intensity of electromagnetic wave sharply decreases in accordance with the distance from the wave source. In the resonance method, this near field (evanescent field) is used to transmit energy (electric power). In other words, the near field is used to cause resonance between a pair of resonators (for example, a pair of LC resonant coils) having the same natural frequency, to thereby transmit the energy (electric power) from one of the resonators (primary self-resonant coil) to the other resonator (secondary self-resonant coil). This near field does not allow propagation of the energy (electric power) over a long distance. Accordingly, as compared to the electromagnetic wave carrying the energy (electric power) by the "radiation electromagnetic field" allowing propagation of the energy over a long distance, the resonance method allows power transmission with reduced energy loss.

Figure 4:
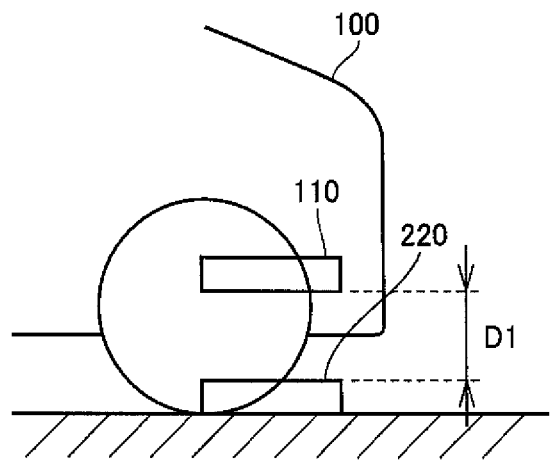
FIG. 4 is a diagram for illustrating the distance between a power reception unit 110 and a power transmission unit 220.

FIG. 4 is a diagram for illustrating the distance between power reception unit 110 and power transmission unit 220.

Referring to FIG. 4, a distance D1 between power reception unit 110 and power transmission unit 220 is a distance longer than the transmission distance by the electromagnetic induction method. Distance D1 is also a distance over which electric power can be transmitted by the resonance method. It is to be noted that distance D1 can be varied by varying the shapes and sizes of the self-resonant coils of power transmission unit 220 and power reception unit 110.

Figure 5:
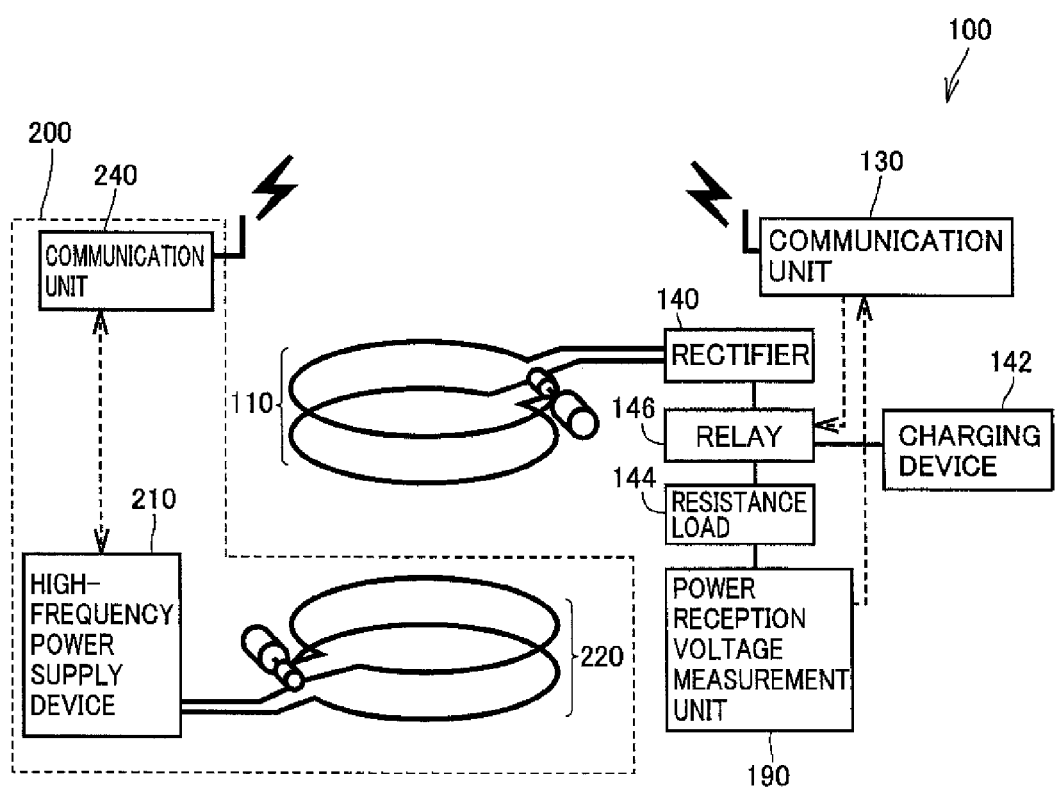
FIG. 5 is a diagram showing a general configuration with regard to power transmission/reception between a vehicle and a power feeding apparatus illustrated in an embodiment.

FIG. 5 is a diagram showing a general configuration with regard to power transmission/reception between the vehicle and the power feeding apparatus described in this embodiment.

Referring to FIG. 5, power feeding apparatus 200 includes power transmission unit 220, high-frequency power supply device 210, and communication unit 240. Vehicle 100 includes communication unit 130, power reception unit 110, a rectifier 140, a relay 146, a resistance 144, a power reception voltage measurement unit (voltage sensor) 190, and a charging device (DC/DC converter 142) for charging a not-shown power storage device.

Communication unit 240 and communication unit 130 communicate wirelessly with each other to exchange information for making the position adjustment between power reception unit 110 and power transmission unit 220. By temporarily connecting resistance 144 via relay 146 to the output of the power transmission unit, voltage information that indicates whether or not a power reception condition is satisfied can be obtained from the output from voltage sensor 190. A power transmission request for weak electric power for obtaining this voltage information is transmitted from vehicle 100 to power feeding apparatus 200 through communication units 130 and 240.

Figure 6:
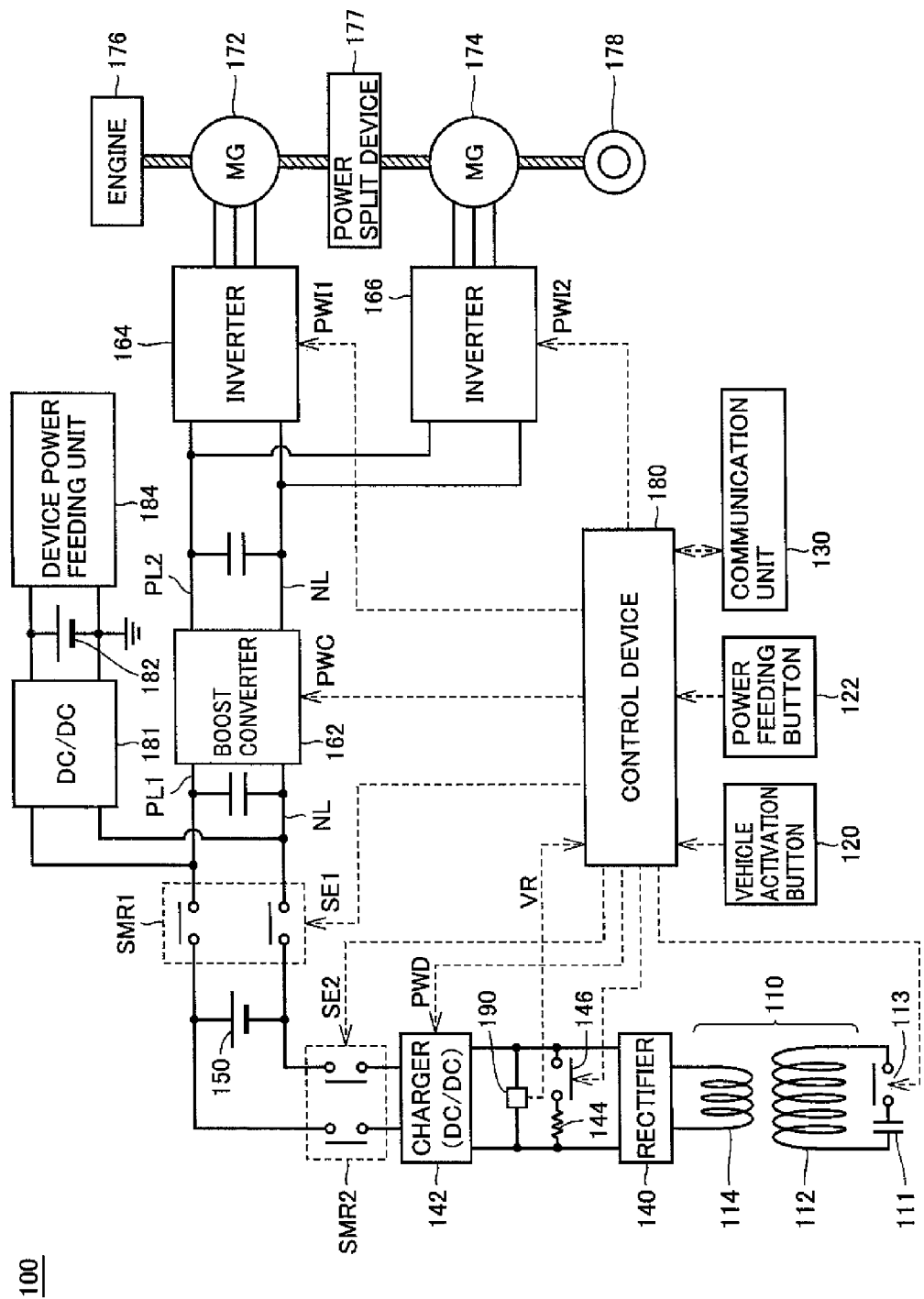
FIG. 6 is a configuration diagram showing the details of a vehicle 100 shown in FIGS. 1 and 5.

FIG. 6 is a configuration diagram showing the details of vehicle 100 shown in FIGS. 1 and 5.

Referring to FIG. 6, vehicle 100 includes a main battery 150, a system main relay SMR1, a boost converter 162, inverters 164 and 166, motor generators 172 and 174, an engine 176, a power split device 177, and a drive wheel 178. Vehicle 100 further includes a secondary self-resonant coil 112, a secondary coil 114, rectifier 140, DC/DC converter 142, a system main relay SMR2, and voltage sensor 190.

Vehicle 100 further includes a control device 180, a vehicle activation button 120, communication unit 130, and a power feeding button 122.

Vehicle 100 is equipped with engine 176 and motor generator 174 as a power source. Engine 176 and motor generators 172 and 174 are coupled to power split device 177. Vehicle 100 runs with a driving force generated by at least one of engine 176 and motor generator 174. The power generated by engine 176 is split by power split device 177 into two paths including a path through which the power is transmitted to drive wheel 178 and a path through which the power is transmitted to motor generator 172.

Motor generator 172 is an AC rotating electric machine including, for example, a three-phase AC synchronous electric motor provided with a rotor into which a permanent magnet is incorporated. Motor generator 172 generates electric power using kinetic energy of engine 176 split by power split device 177. For example, when the state of charge (also referred to as an "SOC") of main battery 150 is reduced below a predetermined value, engine 176 is started and motor generator 172 generates electric power, to charge main battery 150.

Motor generator 174 is also an AC rotating electric machine including, for example, a three-phase AC synchronous electric motor provided with a rotor into which a permanent magnet is incorporated, as with motor generator 172. Motor generator 174 generates a driving force using at least one of the electric power stored in main battery 150 and the electric power generated by motor generator 172. The driving force of motor generator 174 is then transmitted to drive wheel 178.

Furthermore, during braking of the vehicle and during reduction in acceleration on a downwardly sloping surface, the dynamic energy stored in the vehicle as kinetic energy and potential energy is used for rotary drive of motor generator 174 through drive wheel 178, to cause motor generator 174 to operate as a power generator. Consequently, motor generator 174 operates as a regenerative brake for converting the running energy into electric power to generate a braking force. The electric power generated by motor generator 174 is then stored in main battery 150.

Power split device 177 can use a planetary gear including a sun gear, pinion gears, a carrier, and a ring gear. The pinion gears engage with the sun gear and the ring gear. The carrier is coupled to the crankshaft of engine 176 while rotatably supporting the pinion gears. The sun gear is coupled to the rotation shaft of motor generator 172. The ring gear is coupled to the rotation shaft of motor generator 174 and drive wheel 178.

Main battery 150 serves as a rechargeable DC power supply including, for example, a secondary battery such as lithium-ion or nickel-metal hydride secondary battery. Main battery 150 stores the electric power supplied from DC/DC converter 142, and also stores the electric power generated by motor generators 172 and 174. Main battery 150 then supplies the stored electric power to boost converter 162. It is to be noted that a large-capacity capacitor may also be employed as main battery 150 and any power buffer may be used that can temporarily store the electric power supplied from power feeding apparatus 200 (FIG. 1) and the regenerative electric power from motor generators 172 and 174, to supply the stored electric power to boost converter 162.

System main relay SMR1 is disposed between main battery 150 and boost converter 162. System main relay SMR1 electrically connects main battery 150 to boost converter 162 when a signal SE1 from control device 180 is activated, and interrupts the electric path between main battery 150 and boost converter 162 when signal SE1 is deactivated. Based on a signal PWC from control device 180, boost converter 162 boosts the voltage on a positive electrode line PL2 to a voltage greater than or equal to the voltage output from main battery 150. It is to be noted that boost converter 162 includes, for example, a DC chopper circuit.

Inverters 164 and 166 are provided corresponding to motor generators 172 and 174, respectively. Inverter 164 drives motor generator 172 based on a signal PWI1 from control device 180, and inverter 166 drives motor generator 174 based on a signal PWI2 from control device 180. It is to be noted that inverters 164 and 166 include, for example, a three-phase bridge circuit.

Secondary self-resonant coil 112 has both ends connected to a capacitor 111 through a switch (relay 113), and resonates with the primary resonant coil of power feeding apparatus 200 through the electromagnetic field when the switch (relay 113) is rendered conductive. This resonance causes power feeding apparatus 200 in FIGS. 1 and 5 to supply the electric power. Although FIG. 6 shows an example in which capacitor 111 is provided, adjustment with respect to the primary self-resonant coil may be carried out so as to achieve resonance by stray capacitance of the coil, in place of the capacitor.

With regard to secondary self-resonant coil 112, the number of its turns is appropriately set so as to increase the distance to the primary self-resonant coil of power feeding apparatus 200, and a Q value (for example, Q>100) showing the intensity of resonance between the primary self-resonant coil and secondary self-resonant coil 112, and to reduce K showing the degree of coupling therebetween.

Secondary coil 114 is provided coaxially with secondary self-resonant coil 112 and can be magnetically coupled to secondary self-resonant coil 112 by electromagnetic induction. Secondary coil 114 extracts, by electromagnetic induction, the electric power supplied from secondary self-resonant coil 112 and outputs the electric power to rectifier 140. It is to be noted that secondary self-resonant coil 112 and secondary coil 114 form power reception unit 110 shown in FIG. 1.

Rectifier 140 rectifies the AC power extracted by secondary coil 114. Based on a signal PWD from control device 180, DC/DC converter 142 converts the electric power rectified by rectifier 140 into the voltage level of main battery 150, and outputs the resultant to main battery 150.

System main relay SMR2 is disposed between DC/DC converter 142 and main battery 150. When a signal SE2 from control device 180 is activated, system main relay SMR2 electrically connects main battery 150 to DC/DC converter 142. When signal SE2 is deactivated, system main relay SMR2 interrupts the electric path between main battery 150 and DC/DC converter 142. Voltage sensor 190 detects a voltage VR between rectifier 140 and DC/DC converter 142, and outputs the detected value to control device 180.

Resistance 144 and relay 146 which are connected in series are provided between rectifier 140 and DC/DC converter 142. Relay 146 is controlled by control device 180 such that it is rendered conductive when the position of vehicle 100 is adjusted during non-contact power feeding.

Based on the accelerator pedal position, the vehicle speed and the signals from various sensors, control device 180 generates signals PWC, PWI1 and PWI2 for driving boost converter 162 and motor generators 172 and 174, respectively. Control device 180 outputs generated signals PWC, PWI1 and PWI2 to boost converter 162 and inverters 164 and 166, respectively. During the vehicle running, control device 180 activates signal SE1 to cause system main relay SMR1 to be turned on, and deactivates signal SE2 to cause system main relay SMR2 to be turned off.

Weak electric power can be transmitted to determine a power reception state based on voltage VR. Accordingly, the driver or a vehicle guidance system adjusts the position of the vehicle based on voltage VR.

When the position adjustment of the vehicle is completed, control device 180 transmits a power feeding command to power feeding apparatus 200 through communication unit 130, and activates signal SE2 to cause system main relay SMR2 to be turned on. Then, control device 180 generates signal PWD for driving DC/DC converter 142 and outputs generated signal PWD to DC/DC converter 142.

Vehicle 100 further includes an auxiliary battery 182, a DC/DC converter 181 provided between power lines PL1, NL and auxiliary battery 182 for down-converting the voltage of main battery 150 and supplying the resultant to auxiliary loads and auxiliary battery 182, and a device power feeding unit 184.

Device power feeding unit 184 is one of the auxiliary loads, and feeds power to the in-vehicle electrical device in a non-contact manner. In this embodiment, the electromagnetic induction method is employed as a method of feeding power in a non-contact manner by device power feeding unit 184. Typically, the in-vehicle electrical device is a mobile phone, and the device power feeding unit is a unit for charging a battery of the mobile phone. However, the in-vehicle electrical device is not necessarily required to be equipped with a battery, and it is only required that power feeding is performed in a non-contact manner. Other examples of the in-vehicle electrical device include a personal computer, music equipment, a digital camera, a video camera, a game machine, and wireless communication equipment. Although not limited as such, they are often mobile and compact.

Preferably, the electric power received by power reception unit 110 from the external power transmission apparatus installed outside of the vehicle in a non-contact manner is larger than the electric power transmitted from device power feeding unit 184 to the in-vehicle electrical device in a non-contact manner. In addition, main battery 150 of the vehicle has a capacity much larger than the capacity of a battery included in the in-vehicle electrical device such as a mobile phone.

By employing the resonance method when charging main battery 150 of the vehicle and employing the electromagnetic induction when feeding power to the in-vehicle electrical device, the two types of non-contact power transmission/ reception can be performed without affecting each other. If power is fed to both the in-vehicle electrical device and the battery of the vehicle by the resonance method with the same resonant frequency, the in-vehicle electrical device of low output may be affected. Therefore, by employing the different charging methods, namely, the resonance method when charging main battery 150 of the vehicle and the electromagnetic induction when charging the in-vehicle electrical device, the two types of charging can be prevented from affecting on each other. In other words, by employing the different charging methods, a resonant frequency for use in the resonance method can be selected freely, and the degree of freedom for system design in the resonance method can also be increased.

The resonance frequency of a resonance unit (secondary self-resonant coil 112 of power reception unit 110) is determined by an LC component, which is defined by an inductance L of the power reception unit associated with a coil diameter and a capacity C of the capacitor connected to the coil. Since the mobile in-vehicle electrical device is not as large in size as the vehicle, inductance L too great to be incorporated in a general in-vehicle electrical device may be incorporated in the vehicle side.

Figure 7:
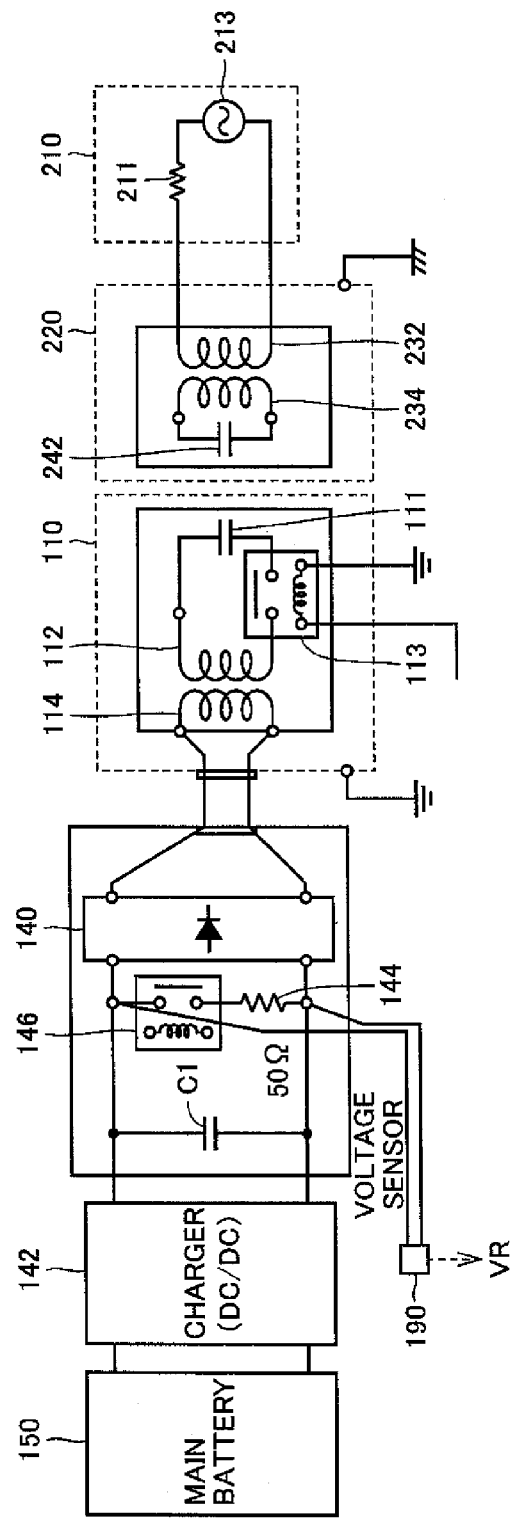
FIG. 7 is a circuit diagram for illustrating power reception unit 110 on the vehicle side and power transmission unit 220 on the power feeding apparatus side in greater detail.

FIG. 7 is a circuit diagram for illustrating power reception unit 110 on the vehicle side and power transmission unit 220 on the power feeding apparatus side in greater detail.

Referring to FIG. 7, high-frequency power supply apparatus 210 is represented by a high-frequency AC power supply 213 and a resistance 211 which shows an impedance of the power supply.

Power transmission unit 220 includes a primary coil 232 connected to high-frequency power supply apparatus 210, a primary self-resonant coil 234 magnetically coupled to primary coil 232 by electromagnetic induction, and a capacitor 242 connected to both ends of primary self-resonant coil 234.

Power reception unit 110 includes secondary self-resonant coil 112 resonating with primary self-resonant coil 234 through the electromagnetic field, and capacitor 111 and relay. 113 connected in series to both ends of secondary self-resonant coil 112. When receiving the electric power, relay 113 is controlled such that it is rendered conductive.

Power reception unit 110 further includes secondary coil 114 magnetically coupled to secondary self-resonant coil 112. Rectifier 140 rectifies the AC power received by secondary coil 114. A capacitor C1 is connected to the output of rectifier 140. Relay 146 and resistance 144 used for the position adjustment between the vehicle and the power feeding facility are connected between the electrodes of capacitor C1. The charger (DC/DC converter 142) is further connected to the output of rectifier 140 for converting the voltage into a suitable charging voltage. The converted charging voltage is supplied to the battery (main battery 150).

Resistance 144 is set to an impedance of, for example, 50Ω. This value is adjusted so as to be matched to the impedance represented by resistance 211 of high-frequency power supply apparatus 210.

When the parking position of the vehicle is adjusted during the non-contact power feeding to the vehicle, voltage sensor 190 detects the voltage across resistance 144 and outputs a detected value VR to control device 180.

When adjustment of the vehicle position is completed and the vehicle is charged by the external power supply through the non-contact power feeding, voltage sensor 190 detects the voltage input to DC/DC converter 142 as detected value VR.

Figure 8:
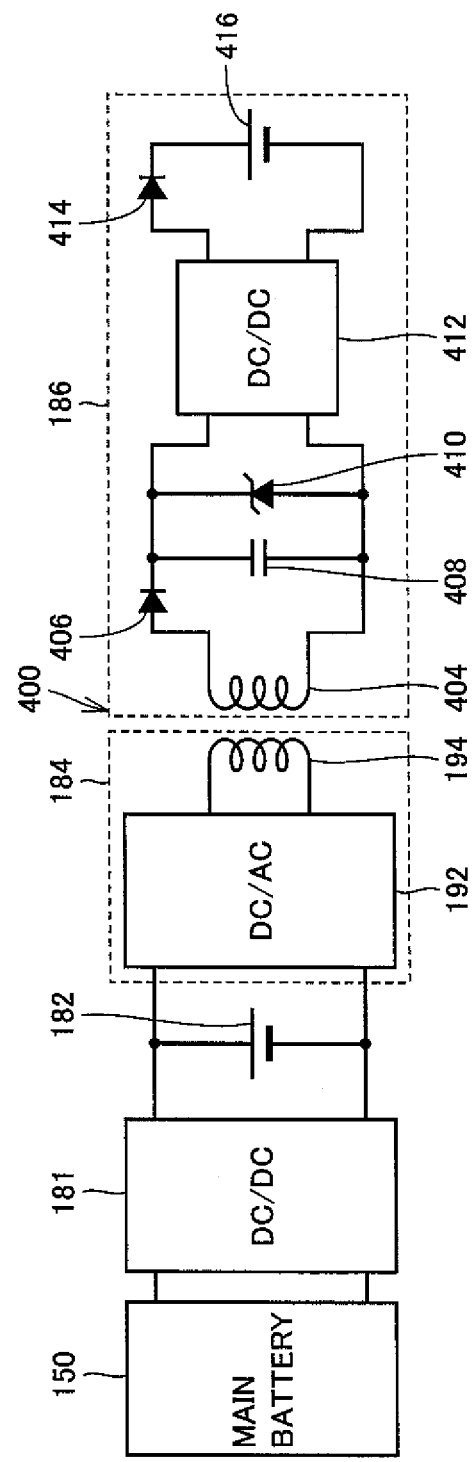
FIG. 8 is a circuit diagram showing the configuration of a device power feeding unit 184 shown in FIG. 6 and a power reception unit of an in-vehicle electrical device.

FIG. 8 is a circuit diagram showing the configuration of device power feeding unit 184 shown in FIG. 6 and the power reception unit of the in-vehicle electrical device.

Referring to FIG. 8, the power transmission/reception system of the vehicle is configured to include device power feeding unit 184 incorporated in the vehicle for charging the electrical device, and a power reception unit 186 included in an in-vehicle electrical device 400 for receiving power from device power feeding unit 184.

In-vehicle electrical device 400 is, for example, a mobile phone, a personal computer, a digital camera, a PDA, a mobile music player, or other types of mobile electrical devices.

Device power feeding unit 184 includes a DC/AC conversion unit 192 for receiving DC power from auxiliary battery 182 and converting the DC power to AC power, and a power feeding side coil 194 for receiving the AC power from DC/AC conversion unit 192.

The charging power is supplied to auxiliary battery 182 from main battery 150 via DC/DC converter 181.

Power reception unit 186 includes a power receiving side coil 404, a diode 406, a capacitor 408, a zener diode 410, a DC/DC converter 412, a diode 414, and a battery 416.

Power receiving side coil 404 has one end connected to the anode of diode 406, Diode 406 has a cathode connected to one end of capacitor 408, the cathode of zener diode 410, and DC/DC converter 412. Power receiving side coil 404 has the other end connected to the other end of capacitor 408, the anode of zener diode 410, and DC/DC converter 412.

DC/DC converter 412 is connected via diode 414 to a positive terminal of battery 416 of in-vehicle electrical device 400, as well as to a negative terminal of battery 416.

When electric power is supplied to DC/DC converter 412 from power receiving side coil 404 by electromagnetic induction between power feeding side coil 194 and power receiving side coil 404, DC/DC converter 412 converts the supplied power to DC power having a predetermined voltage for charging battery 416 and supplies the power to battery 416 through diode 414, to charge battery 416.

Preferably, in addition to DC/DC converter 412, a communication circuit for requesting power feeding from device power feeding unit 184 may be provided. In this case, when a request for power feeding is made, device power feeding unit 184 transmits the electric power by electromagnetic induction.

Although this embodiment shows an example in which battery 416 is included in in-vehicle electrical device 400, battery 416 is not necessarily required in in-vehicle electrical device 400. Battery 416 may not be included in in-vehicle electrical device 400 as long as non-contact power feeding is performed to in-vehicle electrical device 400.

Figure 9:
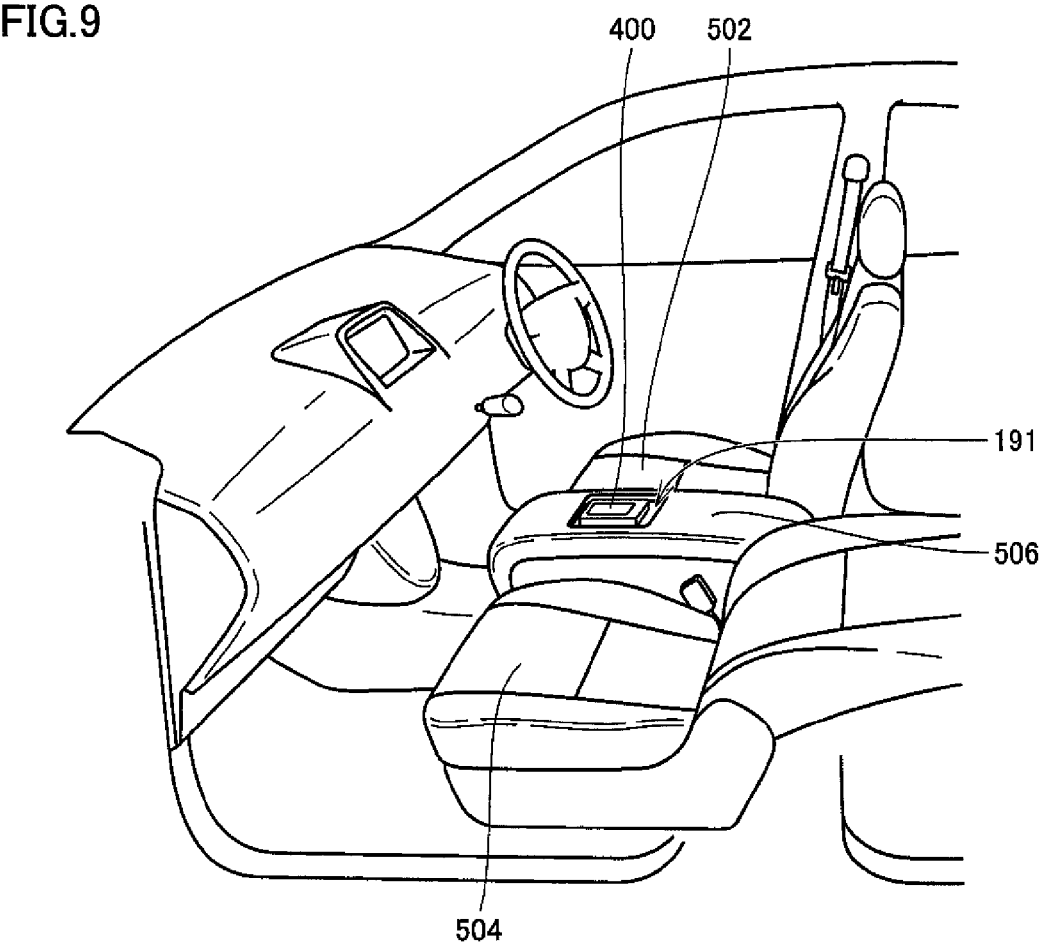
FIG. 9 is a diagram for illustrating an example of arrangement of device power feeding unit 184 in the vehicle.

FIG. 9 is a diagram for illustrating an example of arrangement of device power feeding unit 184 in FIG. 8 in the vehicle.

Referring to FIG. 9, device power feeding unit 184 is preferably arranged in a position in the interior of the vehicle that can be used from a driver's seat 502 as well as from a passenger seat 504. Preferably, device power feeding unit 184 may be provided in a tray of a center console 506, in a pocket of a dashboard, or the like.

If device power feeding unit 184 is arranged in such a position away from power reception unit 110 shown in FIG. 1, the possibility of power feeding to the in-vehicle electrical device and power reception by power reception unit 110 affecting each other is reduced. For illustrative purposes only without limitation, FIG. 9 shows an example in which device power feeding unit 184 is provided in center console 506, with a bottom surface of a tray on which in-vehicle electrical device 400 is placed being indicated as a device placement surface 191.

Figure 10:
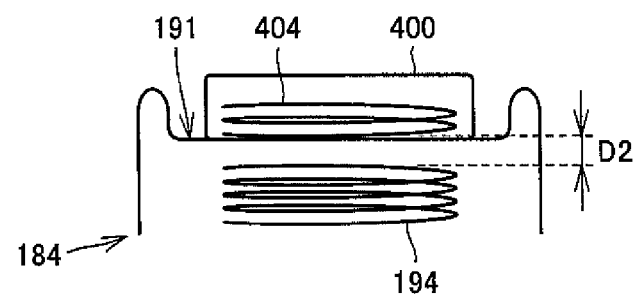
FIG. 10 is a diagram for illustrating the distance between a coil of the in-vehicle electrical device and a coil of the device power feeding unit.

FIG. 10 is a diagram for illustrating the distance between a coil of the in-vehicle electrical device and a coil of the device power feeding unit.

Referring to FIG. 10, housings of in-vehicle electrical device 400 and device power feeding unit 184 are designed to have a distance D2 between power receiving side coil 404 included in or mounted on in-vehicle electrical device 400 and power feeding side coil 194 in device power feeding unit 184. Distance D2 is a distance over which electric power can be transmitted by electromagnetic induction, and is shorter than distance D1 shown in FIG. 4.

Device power feeding unit 184 includes device placement surface 191, which is not in electrical contact with in-vehicle electrical device 400 and on which in-vehicle electrical device 400 is placed.

Although in-vehicle electrical device 400 is not in electrical contact with device power feeding unit 184, their housings generally physically come in contact with each other. The housings are provided with projections and recesses, magnets and the like for the purpose of position adjustment. The user can lift in-vehicle electrical device 400 by hand, place it on device placement surface 191 of device power feeding unit 184 and make the position adjustment, to readily attain a state without position mismatch. This point is significantly different from the position adjustment between power transmission unit 220 and power reception unit 110 shown in FIG. 1.

Thus, when feeding power to a vehicle-mounted battery and an in-vehicle electrical device with the resonance method and the electromagnetic induction method, it is preferable to charge the vehicle-mounted battery with the resonance method and to feed power to the in-vehicle electrical device with the electromagnetic induction method.

Even in the electromagnetic induction method requiring high accuracy for position adjustment between power transmission and reception units, the user can make the position adjustment directly by himself/herself in a vehicle, thus attaining non-contact power feeding to an in-vehicle electrical device with high efficiency. When charging a vehicle-mounted battery, on the other hand, it is difficult for the user to make accurate position adjustment by himself/herself between a power transmission provided on the ground side and a power reception unit provided on the vehicle side. When charging the vehicle-mounted battery in a non-contact manner, therefore, the resonance method requiring less accuracy for position adjustment than the electromagnetic induction method can be employed to charge the battery with high efficiency while the trouble with the position adjustment for the user is reduced.

Moreover, by employing the electromagnetic induction method to charge the in-vehicle electrical device, the system design can be facilitated and the charging device itself can be made compact and less expensive. The degree of freedom for arrangement of the charging device is also increased.

Furthermore, by employing the different methods for non-contact charging of the vehicle-mounted battery and for non-contact feeding power to the in-vehicle electrical device, different resonant frequencies do not need to be used as compared to the case where the resonance method is employed for both the charging and power feeding. Thus, a resonant frequency of the non-contact power reception device of the vehicle-mounted battery can be selected freely.

Figure 11:
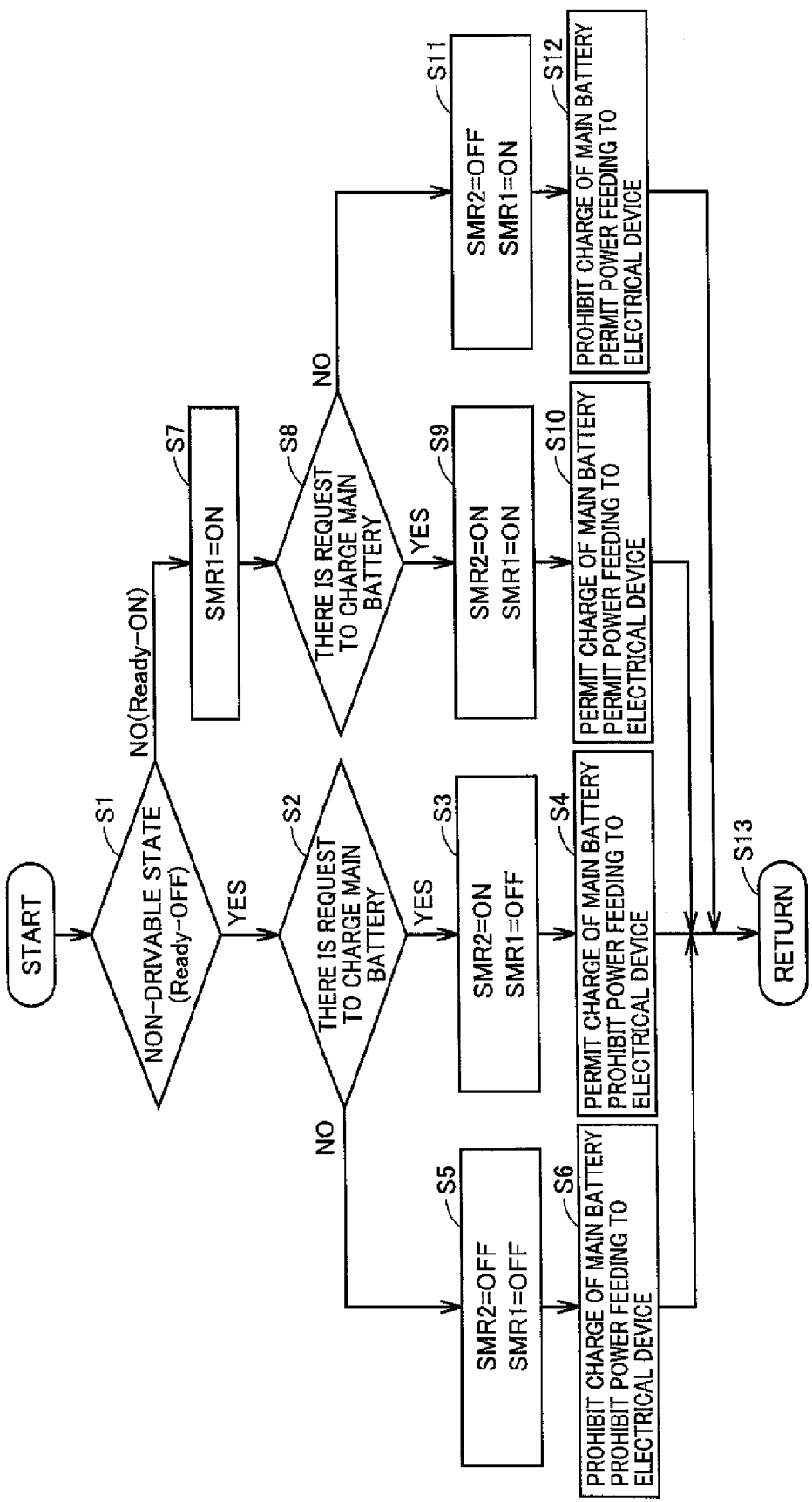
FIG. 11 is a flowchart for illustrating control with regard to permission of power transmission/reception performed by a control device 180 shown in FIG. 6.

FIG. 11 is a flowchart for illustrating control with regard to permission of power transmission/reception performed by control device 180 shown in FIG. 6. A process in this flowchart is called from a main routine for controlling the vehicle and executed at regular time intervals or whenever a predetermined condition is satisfied.

Referring to FIGS. 6 and 11, when the process is started, in step S1, control device 180 determines whether or not the vehicle is in a vehicle non-drivable state.

When the vehicle is in the vehicle non-drivable state (Ready-OFF state), for example, the vehicle enters a drivable state (Ready-ON state) by the push of vehicle activation button 120 once, and the vehicle is ready to be started by the setting of a shift range to a drive range and the pressing of an accelerator pedal.

When the vehicle is in the drivable state (Ready-ON state), the vehicle enters the vehicle non-drivable state (Ready-OFF state) by the push of vehicle activation button 120 again, and the vehicle is not started even by the pressing of the accelerator pedal.

In the drivable state, system main relay SMR1 in FIG. 6 is conducting, an electric current can be supplied to motor generators 172 and 174, and engine 176 can be operated.

In the non-drivable state, on the other hand, system main relay SMR1 in FIG. 6 is not conducting, supply of an electric current to motor generators 172 and 174 is prohibited, and the operation of engine 176 is also prohibited.

If the vehicle is in the non-drivable state (Ready-OFF state) in step S1, the process proceeds to step S2. If the vehicle is in the drivable state (Ready-ON state) in step S1, the process proceeds to step S7.

In step S2, control device 180 determines whether or not there is a request to charge main battery 150. The request to charge main battery 150 may be provided via an input device (such as power feeding button 122 in FIG. 6) operated by the driver, for example, or may be generated by control device 180 itself based on a signal indicating the completion of position adjustment between power transmission unit 220 and power reception unit 110 in FIG. 1 and the SOC (State Of Charge) of main battery 150.

If there is a request to charge main battery 150 in step S2, the process proceeds from step S2 to step S3. If there is no charge request in step S2, the process proceeds from step S2 to step S5.

In step S3, system main relay SMR2 is controlled such that it is turned on while system main relay SMR1 is controlled such that it is turned off. Then, in step S4, charging of main battery 150 is permitted while power feeding to the in-vehicle electrical device is prohibited. It is assumed that this state includes a state where the driver is away from the vehicle while main battery 150 is being charged.

In step S5, both of system main relays SMR1 and SMR2 are controlled such that they are turned off. Then, in step S6, both of charging of main battery 150 and power feeding to the in-vehicle electrical device are prohibited.

If the vehicle is in the drivable state (Ready-ON state) in step S1 and the process proceeds to step S7, system main relay SMR1 is controlled such that it is turned on and an electric current can be supplied to motor generators 172 and 174 in the vehicle. In this state, it is assumed that the driver remains in the vehicle, and auxiliary machinery such as an air conditioner and audio equipment which are not shown can be used. Then, in step S8, it is determined whether or not there is a request to charge main battery 150. If there is a request to charge main battery 150 in step S8, the process proceeds to step S9. If there is no charge request in step S8, the process proceeds to step S11.

In step S9, both of system main relays SMR1 and SMR2 are controlled such that they are turned on. Then, in step S10, both of charging of main battery 150 and power feeding to the in-vehicle electrical device are permitted.

In step S11, system main relay SMR2 is controlled such that it is turned off while system main relay SMR1 is controlled such that it is turned on. Then, in step S12, charging of main battery 150 is prohibited while power feeding to the in-vehicle electrical device is permitted.

When processing in any of steps S4, S6, S10 and S12 is completed, in step S13, the control is returned to the main routine.

Figure 12:
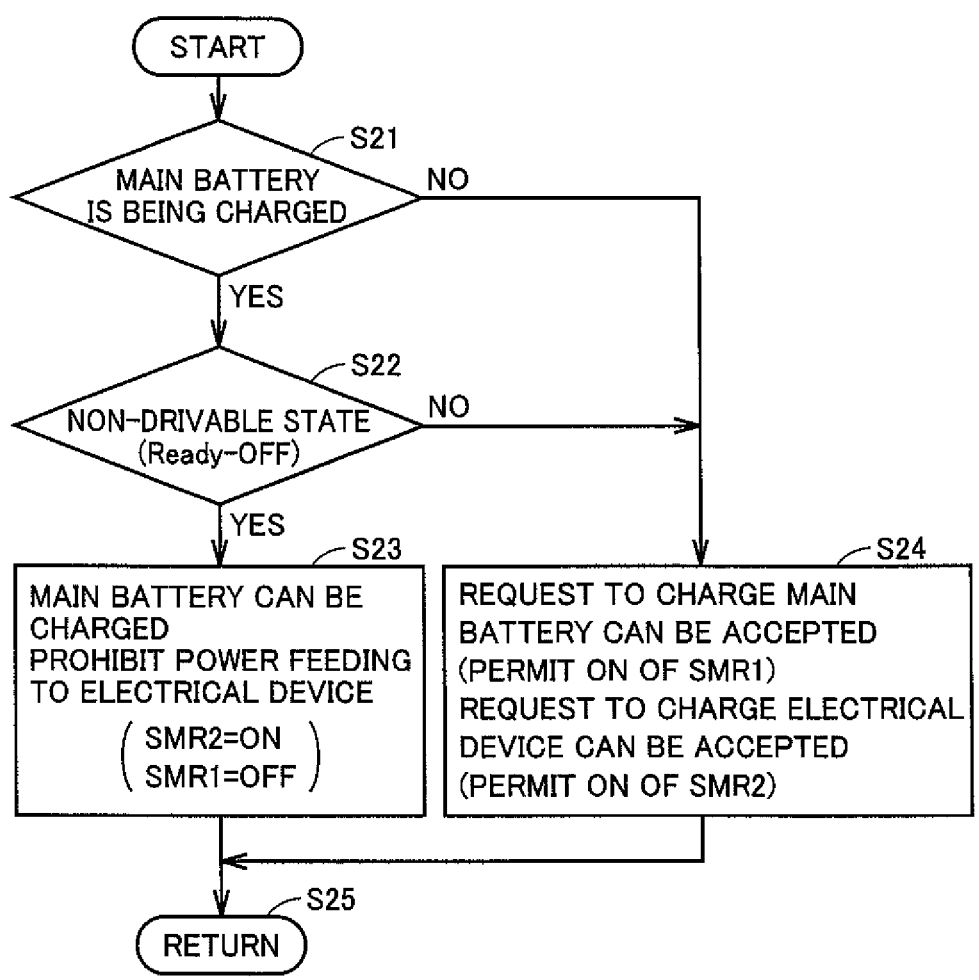
FIG. 12 is a flowchart for illustrating a variation of the control with regard to the permission of power transmission/reception performed by control device 180 shown in FIG. 6.

FIG. 12 is a flowchart for illustrating a variation of the control with regard to the permission of power transmission/reception performed by control device 180 shown in FIG. 6. A process in this flowchart is called from the main routine for controlling the vehicle and executed at regular time intervals or whenever a predetermined condition is satisfied.

Referring to FIGS. 6 and 12, when the process is started, in step S21, control device 180 determines whether or not main battery 150 is being charged. If main battery 150 is not being charged in step S21, the process proceeds to step S24. If main battery 150 is being charged in step S21, the process proceeds to step S22.

In step S22, it is determined whether or not the vehicle is currently in the non-drivable state (Ready-OFF state). If the vehicle is in the non-drivable state in step S22, the process proceeds to step S23. If the vehicle is not in the non-drivable state in step S22, namely, is in the drivable state (Ready-ON state), the process proceeds to step S24.

In step S23, control device 180 controls system main relays SMR1 and SMR2, DC/DC converter 142, and device power feeding unit 184 such that main battery 150 can be charged and power feeding to the in-vehicle electrical device is prohibited.

In step S24, on the other hand, control device 180 controls system main relays SMR1 and SMR2, DC/DC converter 142, and device power feeding unit 184 such that a request to charge main battery 150 can be accepted and a request to feed power to the in-vehicle electrical device can be accepted.

Generally, when the driver leaves the vehicle during charge of main battery 150, the driver sets the vehicle in the non-drivable state. In such a case, power feeding to the in-vehicle electrical device can be prohibited, thus avoiding the occurrence of an unexpected situation due to power feeding to the in-vehicle electrical device during the absence of an occupant such as the driver.

It is also assumed that, during charge of main battery 150, the driver or the like waits in the vehicle and activates air conditioning functions or an audio device. If it is assumed that the occupant is in the interior of the vehicle in this manner, non-contact power feeding to the in-vehicle electrical device can be also permitted to improve convenience.

Lastly, this embodiment will be summarized again with reference to the drawings. Referring to FIG. 6, vehicle 100 includes power reception unit 110 for receiving electric power for the running of vehicle 100 in a non-contact manner by electromagnetic field resonance, and device power feeding unit 184 for transmitting electric power to be supplied to the in-vehicle electrical device in a non-contact manner by electromagnetic induction.

Preferably, the electric power received by power reception unit 110 from the external power transmission apparatus installed outside of the vehicle in a non-contact manner is larger than the electric power transmitted from device power feeding unit 184 to the in-vehicle electrical device in a non-contact manner. In addition, main battery 150 of the vehicle has a capacity much larger than the capacity of a battery included in the in-vehicle electrical device such as a mobile phone.

Preferably, distance D1 (1 cm to several meters) shown in FIG. 4 over which the electric power is transmitted from external power transmission unit 220 installed outside of the vehicle to power reception unit 110 in a non-contact manner is longer than distance D2 (<1 cm) shown in FIG. 10 over which the electric power is transmitted from device power feeding unit 184 to in-vehicle electrical device 400 in a non-contact manner.

More preferably, vehicle 100 further includes motor generators 172 and 174 for driving the vehicle, main battery 150 for supplying the electric power to motor generators 172 and 174, and auxiliary battery 182 provided separately from main battery 150. Auxiliary battery 182 has a voltage of, for example, 12 to 14 V, which is lower than a voltage of, for example, 200 V, of main battery 150. Device power feeding unit 184 receives the electric power from auxiliary battery 182 and transmits the power to in-vehicle electrical device 400.

Further preferably, the vehicle further includes control device 180 for setting an operation state of the vehicle to the drivable state (Ready-ON state) and the non-drivable state (Ready-OFF state) in accordance with the operation on activation button 120 and the like by the occupant. As shown in FIG. 12, in the drivable state (NO in step S22), control device 180 allows charging of main battery 150 with the electric power received by power reception unit 110, and allows power supply from device power feeding unit 184 to in-vehicle electrical device 400. In the non-drivable state (YES in step S22), control device 180 allows charging of main battery 150 with the electric power received by power reception unit 110, and prohibits power supply from device power feeding unit 184 to in-vehicle electrical device 400.

Preferably, the position adjustment between power reception unit 110 and power transmission unit 220 installed outside of the vehicle shown in FIG. 1 is performed by movement of vehicle 100. On the other hand, the position adjustment between in-vehicle electrical device 400 and device power feeding unit 184 shown in FIG. 10 is performed by placement of in-vehicle electrical device 400 in a predetermined position (device placement surface 191) of device power feeding unit 184 by the occupant.

More preferably, as shown in FIGS. 9 and 10, device power feeding unit 184 includes device placement surface 191, which is not in electrical contact with in-vehicle electrical device 400 and on which in-vehicle electrical device 400 is placed.

Although this embodiment shows an example in which the primary self-resonant coil, the primary coil, the secondary self-resonant coil and the secondary coil are included in FIGS. 6, 7 and the like, the present invention is not limited to such an arrangement but is applicable to an arrangement where power transmission between secondary self-resonant coil 112 and secondary coil 114 and power transmission between primary coil 232 and primary self-resonant coil 234 are not performed by electromagnetic induction. That is, the present invention is applicable to the case where the resonance method is used for power reception by the vehicle and power transmission to the vehicle, and also to the case where a coil through which power transmission/reception is performed by electromagnetic induction is not provided on a path for power transmission/reception by the resonance method.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 10 power transmission/reception system; 100 vehicle; 110 power reception unit; 111, 242, 408, C1 capacitor; 112, 340 secondary self-resonant coil; 113, 146 relay; 114, 350 secondary coil; 120 vehicle activation button; 122 power feeding button; 130, 240 communication unit; 140 rectifier; 142, 181, 412 DC/DC converter; 144, 211 resistance; 150 main battery; 162 boost converter; 164, 166 inverter; 172, 174 motor generator; 176 engine; 177 power split device; 178 drive wheel; 180 control device; 182 auxiliary battery; 184 device power feeding unit; 186 power reception unit; 190 voltage sensor; 191 device placement surface; 192 DC/AC conversion unit; 194 power feeding side coil; 200 power feeding apparatus; 210 high-frequency power supply device; 212 connector; 213 high-frequency AC power supply; 220 power transmission unit; 232, 320 primary coil; 234, 330 primary self-resonant coil; 310 high-frequency power supply; 316, 416 battery; 360 load; 400 in-vehicle electrical device; 404 power receiving side coil; 406, 414 diode; 410 zener diode; SMR1, SMR2 system main relay.

The invention claimed is:

1. A vehicle comprising:
a main battery;
a converter connected to the main battery;
an inverter connected to the converter and a rotational electric machine;
a first relay provided between the main battery and the converter;
a power reception device that receives electric power for running of the vehicle in a non-contact manner by electromagnetic field resonance;
a second relay provided between the main battery and the power reception device;
a power transmission device that transmits electric power to be supplied to an in-vehicle electrical device in a non-contact manner by electromagnetic induction, the power transmission device being configured to receive electric power from the main battery via the first relay; and
a control unit that:
switches between ON/OFF states of the first relay and ON/OFF states of the second relay;
prohibits power supply from the power transmission device to the in-vehicle electrical device when the power reception device can receive electric power with the first relay being OFF and the second relay being ON;
prohibits power supply from the power transmission device to the in-vehicle electrical device when the power reception device is prohibited from receiving electric power with the first relay being OFF and the second relay being OFF; and
allows power supply from the power transmission device to the in-vehicle electrical device when the first relay is ON.

2. The vehicle according to claim 1, wherein:
the electric power received by the power reception device from an external power transmission apparatus installed outside of the vehicle in a non-contact manner is larger than the electric power transmitted from the power transmission device to the in-vehicle electrical device in a non-contact manner.

3. The vehicle according to claim 2, wherein:
a distance over which the electric power is transmitted from the external power transmission apparatus installed outside of the vehicle to the power reception device in a non-contact manner is longer than a distance over which the electric power is transmitted from the power transmission device to the in-vehicle electrical device in a non-contact manner.

4. The vehicle according to claim 3, further comprising:
an auxiliary battery provided separately from the main battery and that receives electric power form the main battery via the first relay,
the auxiliary battery having a voltage lower than a voltage of the main battery;
wherein the power transmission device receives electric power from the auxiliary battery and transmits the power to the in-vehicle electrical device.

5. The vehicle according to claim 4, wherein the control unit:
sets an operation state of the vehicle to a drivable state and a non-drivable state in accordance with operation by an occupant;
in the drivable state:
allows charging of the main battery with the electric power received by the power reception device; and
allows power supply from the power transmission device to the in-vehicle electrical device; and
in the non-drivable state:
allows charging of the main battery with the electric power received by the power reception device; and
prohibits power supply from the power transmission device to the in-vehicle electrical device.

6. The vehicle according to claim 1, wherein:
position adjustment between the power reception device and the external power transmission apparatus installed outside of the vehicle is performed by movement of the vehicle; and
position adjustment between the in-vehicle electrical device and the power transmission device is performed by placement of the in-vehicle electrical device in a predetermined position relative to the power transmission device by an occupant.

7. The vehicle according to claim 6, wherein:
the power transmission device includes a device placement surface, which is not in electrical contact with the in-vehicle electrical device and on which the in-vehicle electrical device is placed.

8. A power transmission/reception system comprising:
a power transmission apparatus outside of a vehicle for transmitting electric power to the vehicle in a non-contact manner by electromagnetic field resonance;
an in-vehicle electrical device used in the vehicle; and
the vehicle, comprising:
a battery;
a converter connected to the battery;
an inverter connected to the converter and a rotational electric machine;
a first relay provided between the battery and the converter;
a power reception device that receives electric power for running of the vehicle from the power transmission apparatus outside of the vehicle in a non-contact manner by electromagnetic field resonance;
a second relay provided between the battery and the power reception device;
a power transmission device that transmits electric power to be supplied to the in-vehicle electrical device in a non-contact manner by electromagnetic induction, the power transmission device being configured to receive electric power from the battery via the first relay; and
a control unit that:
switches between ON/OFF states of the first relay and ON/OFF states of the second relay;

prohibits power supply from the power transmission device to the in-vehicle electrical device when the power reception device can receive electric power with the first relay being OFF and the second relay being ON:

prohibits power supply from the power transmission device to the in-vehicle electrical device when the power reception device is prohibited from receiving electric power with the first relay being OFF and the second relay being OFF; and allows power supply from the power transmission device to the in-vehicle electrical device when the first relay is ON.

* * * * *